(12) United States Patent
Yu

(10) Patent No.: US 12,208,734 B2
(45) Date of Patent: Jan. 28, 2025

(54) ACTUATOR FOR FOLDING OUTSIDE REARVIEW MIRROR FOR VEHICLE AND OUTSIDE REARVIEW MIRROR INCLUDING THE SAME

(71) Applicant: SMR Automotive Modules Korea Ltd., Cheongju-si (KR)

(72) Inventor: Il Sung Yu, Incheon (KR)

(73) Assignee: SMR Automotive Modules Korea Ltd., Cheongju-si (KR)

( * ) Notice: Subject to any disclaimer, the term of this patent is extended or adjusted under 35 U.S.C. 154(b) by 688 days.

(21) Appl. No.: 17/535,586

(22) Filed: Nov. 25, 2021

(65) Prior Publication Data
US 2022/0161725 A1 May 26, 2022

(30) Foreign Application Priority Data
Nov. 25, 2020 (KR) .................. 10-2020-0160514

(51) Int. Cl.
| | | |
|---|---|---|
| B60R 1/074 | (2006.01) | |
| F16H 57/00 | (2012.01) | |
| F16H 57/028 | (2012.01) | |
| H02K 5/24 | (2006.01) | |
| H02K 7/116 | (2006.01) | |
| F16H 19/08 | (2006.01) | |

(52) U.S. Cl.
CPC ......... *B60R 1/074* (2013.01); *F16H 57/0006* (2013.01); *F16H 57/028* (2013.01); *H02K 5/24* (2013.01); *H02K 7/1166* (2013.01); *F16H 19/08* (2013.01)

(58) Field of Classification Search
CPC ... B60R 1/074; F16H 57/0006; F16H 57/028; F16H 19/08; H02K 5/24; H02K 7/1166

USPC .......................................................... 359/872
See application file for complete search history.

(56) References Cited

U.S. PATENT DOCUMENTS 6,257,731 B1 * 7/2001 Oh .......................... B60R 1/074
                                                        359/872

FOREIGN PATENT DOCUMENTS

| JP | 2004-521597 A | 7/2004 |
| JP | 2020-015433 A | 1/2020 |
| KR | 10-2004-0009831 A | 1/2004 |
| KR | 10-2005-0080521 A | 8/2005 |

(Continued)

OTHER PUBLICATIONS

Korean Office Action in Application No. 10-2020-0160514 dated Mar. 27, 2022 with English translation, 15 pages.

(Continued)

*Primary Examiner* — Greg Binda
(74) *Attorney, Agent, or Firm* — Park, Kim & Suh, LLC

(57) ABSTRACT

Disclosed is a folding mechanism for an outside rearview mirror of a vehicle. In more detail, disclosed is an actuator mechanism of an outside rearview mirror for a vehicle. Here, the actuator mechanism includes a lower case including a shaft fixing region, a driving motor including a gear-shaft having one end engaged with the shaft fixing region and restricted in movement in a first axial direction and a body portion vibrating in the first axial direction, an actuator module; and an upper case including a first elastic support region and configured to cover the lower case. Here, the first elastic region elastically restricts vibration of the body portion in an axial direction.

10 Claims, 10 Drawing Sheets

(56) References Cited

FOREIGN PATENT DOCUMENTS

KR        10-2005270  B1      7/2019

OTHER PUBLICATIONS

Korean Patent Decision in Application No. 10-2020-0160514 dated May 30, 2022 with English translation, 3 pages.

\* cited by examiner

3000

ACTUATOR FOR FOLDING OUTSIDE REARVIEW MIRROR FOR VEHICLE AND OUTSIDE REARVIEW MIRROR INCLUDING THE SAME

CROSS-REFERENCE TO RELATED APPLICATION

This application claims the benefit of Korean Patent Application No. 10-2020-0160514, filed on Nov. 25, 2020, in the Korean Intellectual Property Office, the disclosure of which is incorporated herein in its entirety by reference.

FIELD OF THE INVENTION

The present invention relates to an actuator for folding an outside rearview mirror of a vehicle, and more particularly, to an actuator including a driving motor case configured to elastically support a driving motor to prevent vibrations and noise of the driving motor.

BACKGROUND OF THE RELATED ART

When an outside rearview mirror for a vehicle is folded or unfolded, generally, an actuator for an outside rearview mirror, in which a driving motor is mounted, is mounted in the outside rearview mirror for a vehicle and performs folding and unfolding operations.

However, when a driver of a vehicle folds or unfolds the outside rearview mirror, the durability of the actuator diminishes due to excessive vibrations of the motor and an excessive amount of noise caused by vibrations of the motor occurs while the actuator for an outside rearview mirror operates.

Accordingly, it is necessary to provide an actuator for an outside rearview mirror of a vehicle which includes a motor accommodation portion configured to elastically support a driving motor so as to prevent vibrations and noise of the driving motor.

SUMMARY OF THE INVENTION

The present invention is directed to providing an actuator for an outside rearview mirror of a vehicle which operates to relieve vibrations and noise while folding or unfolding an outside rearview mirror of a vehicle.

Technical Solution

According to an aspect of the present invention, there is provided an actuator mechanism of an outside rearview mirror for a vehicle. The actuator mechanism includes a lower case including a shaft fixing region, a driving motor including a gear-shaft configured to rotate along a first axis and transmit power and having one end engaged with the shaft fixing region to be restricted in movement in a first axial direction and a body portion configured to receive power from the outside and transmit rotating power to the gear-shaft while vibrating in the first axial direction, an actuator module accommodated in the lower case and including a driving gear configured to receive rotating power of the gear-shaft and rotate along a second axis and an output gear configured to receive rotating power of the driving gear and induce rotation of the outside rearview mirror, and an upper case configured to accommodate the driving motor, including a first elastic support region configured to elastically support a first surface of the body portion which is defined as a surface opposite a surface on which the gear shaft is located, and configured to cover the lower case. Here, the first elastic support region includes a first opening region of the upper case and one or more first elastic support sections protruding to a predetermined length along a periphery of the first opening region and having one side which is formed as a free end. Also, at least parts of the first elastic support sections support at least a part of the first surface of the body portion so as to elastically restrict vibration of the body portion in an axial direction.

Effects of the Invention

According to one aspect of the present invention, an actuator including a case configured to elastically support a driving motor for an operation of folding or unfolding an outside rearview mirror of a vehicle so as to relieve vibrations and noise caused by the driving motor can be provided.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
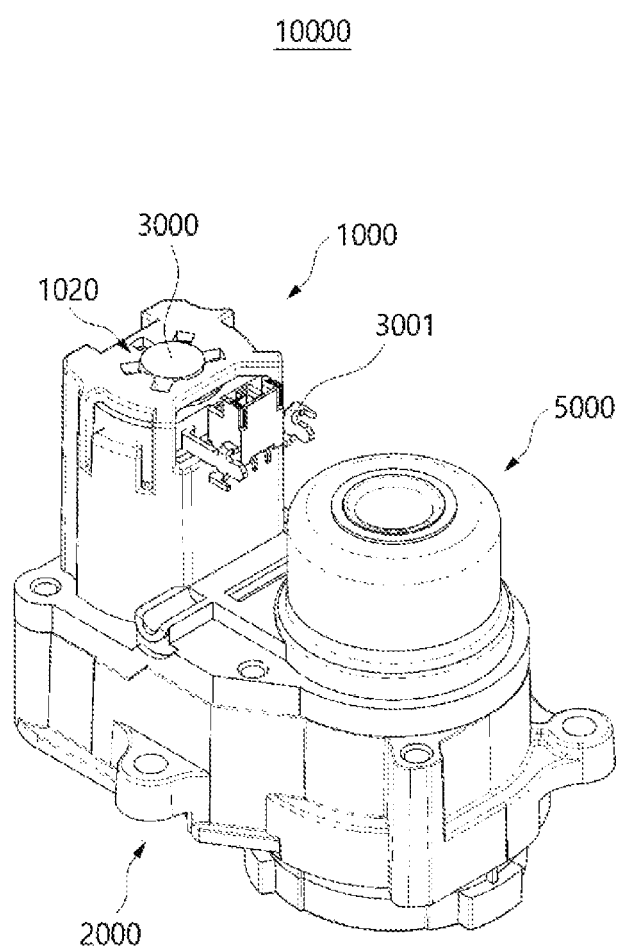
FIG. 1 illustrates the entirety of an actuator mechanism according to one embodiment.

The aspects, features, and advantages of the present disclosure will be more apparent from the following detailed description taken in conjunction with the attached drawings. However, since the present invention may be variously modified and have a variety of embodiments, particular embodiments will be illustrated in the drawings and described below in detail.

Throughout the drawings, thicknesses of layers and regions are exaggerated for clarity. Also, when one element or layer is referred to as being "on" another element or layer, the one element or layer is not only directly on the other element or layer but also an additional layer or element may be interposed therebetween. Throughout the specification, like reference numerals basically refer to like elements. Also, in the drawings with respect to the embodiments, elements having the same function within the same conceptual scope will be referred to with the same reference numerals.

In a description of the embodiments of the present invention, a detailed description of well-known functions or components of the related art will be omitted when it is deemed to obscure understanding of the essentials of the present invention. Also, the ordinal numbers used herein, for example, first, second, and the like, are merely identifiers for distinguishing one element from another.

Hereinafter, the terms "module" and "portion" with respect to components used herein will be given or used in consideration of only the ease in drafting the specification and do not have distinct meanings or roles by themselves.

The present invention relates to an actuator mechanism for folding an outside rearview mirror for a vehicle. In more detail, the present invention relates to an actuator mechanism including a housing for elastically accommodating a motor so as to prevent vibrations of the motor for driving the actuator mechanism.

According to one embodiment, the actuator mechanism is mounted in an outside rearview mirror for a vehicle and performs an operation of folding the outside rearview mirror for the vehicle.

First, an overall configuration of an actuator mechanism according to one embodiment will be described with reference to FIGS. 1 and 2.

Figure 2:
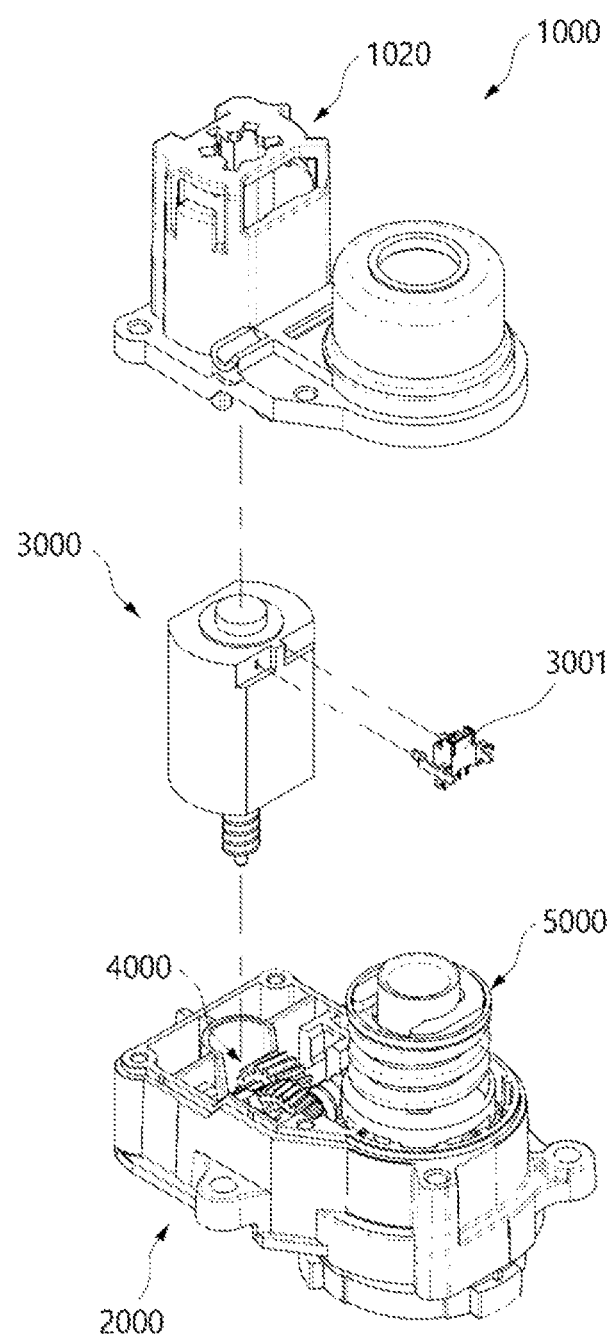
FIG. 2 is a semi-exploded view of the actuator mechanism according to one embodiment.

FIG. 1 illustrates the entirety of an actuator mechanism according to one embodiment, and FIG. 2 is a semi-exploded view of the actuator mechanism according to one embodiment.

Referring to FIGS. 1 and 2, the actuator mechanism 10000 according to one embodiment includes a lower case 2000, a gear mechanism 4000, a rotation-driving portion 5000, a driving motor 3000, and an upper case 1000.

The lower case 2000 accommodates the rotation-driving portion 5000 mechanically connected to a side mirror and the gear mechanism 4000 configured to transmit power to the rotation-driving portion 5000. The driving motor 3000 further includes a connector 3001. The driving motor 3000 which receives power from the outside through the connector 3001 transmits rotating power to the gear mechanism 4000 so that the rotation-driving portion 5000 may operate.

The upper case 1000 may be configured to cover an upper side of the lower case 2000 and may protect the driving motor 3000, the rotation-driving portion 5000, and the gear mechanism 4000.

Also, the upper case 1000 may elastically support the driving motor 3000 so as to suppress vibrations of the driving motor 3000 and prevent noise. In detail, one side of the driving motor 3000 is fixed to the lower case 2000 and the other side is accommodated in the upper case 1000. In more detail, one end of the driving motor 3000 is fixed to the lower case 2000 and the other end comes into elastic contact with and is supported by a first elastic support portion 1100 of the upper case 1000.

Hereinafter, respective components of the actuator mechanism 10000 according to one embodiment will be described with reference to the drawings.

Figure 3:
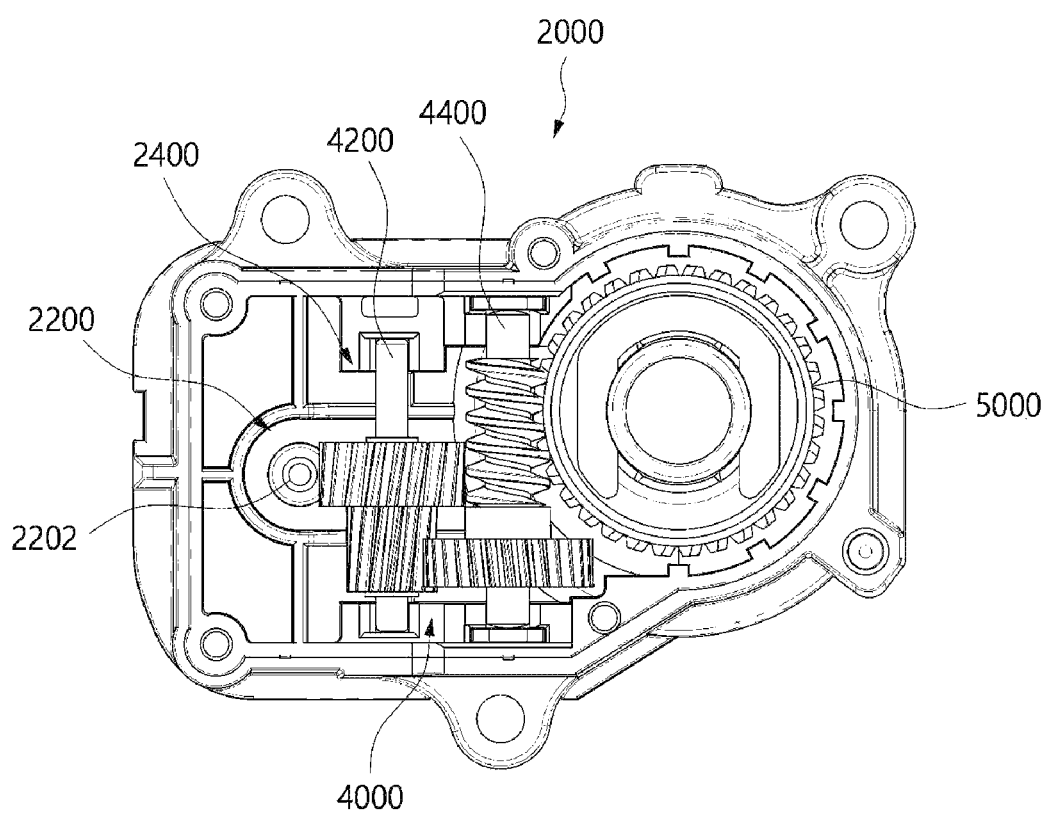
FIG. 3 illustrates a lower case and a gear mechanism accommodated in the lower case according to one embodiment.

FIG. 3 illustrates a lower case and the gear mechanism accommodated in the lower case according to one embodiment.

Referring to FIG. 3, the lower case 2000 according to one embodiment may accommodate the gear mechanism 4000 and the rotation-driving portion 5000. In detail, a gear mechanism accommodation portion 2400 may accommodate the gear mechanism 4000. The rotation-driving portion 5000 may be accommodated in the lower case 2000 to be engaged with the gear mechanism 4000 and may receive rotating power from the gear mechanism 4000 so as to operate.

Here, the gear mechanism 4000 includes a first driving gear 4200 configured to receive power from the driving motor 3000 and a second driving gear 4400 configured to transmit power to the rotation-driving portion 5000. Here, the first and second driving gears may be referred to as first and second output gears or first and second transmission gears in the sense of transmitting the power of the driving motor 3000 to the rotation-driving portion 5000.

Also, the lower case 2000 may include a gear-shaft accommodation region 2200. The gear-shaft accommodation region 2200 accommodates a gear-shaft of the driving motor 3000. Here, the gear-shaft accommodation region 2200 may further include a shaft fixing portion 2202. The shaft fixing portion 2202 may fixedly accommodate one end of a shaft of the driving motor 3000 so as to prevent the shaft of the driving motor 3000 from vibrating in an axial direction.

Figure 4:
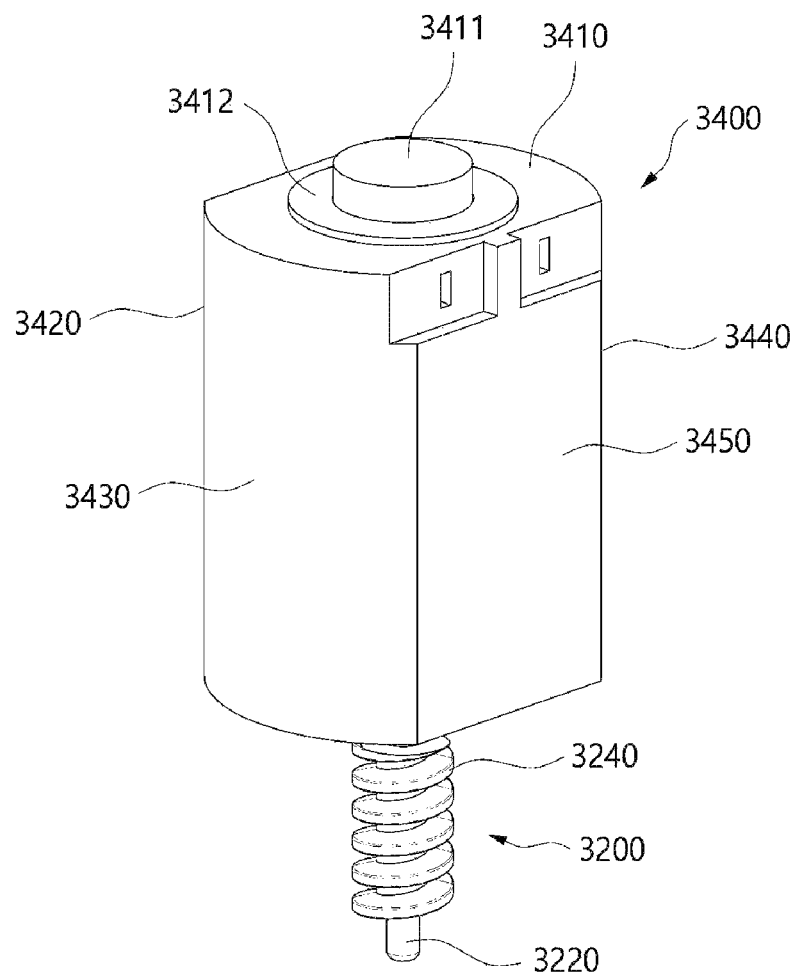
FIG. 4 illustrates a driving motor according to one embodiment.

FIG. 4 illustrates the driving motor according to one embodiment.

Referring to FIG. 4, the driving motor 3000 may include a body portion 3400 and a gear-shaft portion 3200.

The body portion 3400 includes an opposite surface of a surface on which the gear-shaft portion 3200 is located, that is, an upper surface 3410 of the motor. The upper surface 3410 may further include a protruding portion 3411, and the protruding portion 3411 may be inserted into a first opening portion 1120 (refer to FIG. 7) as described above. Also, an elastic member 3412 may be further mounted on the protruding portion 3411. The elastic member 3412 may have a ring shape corresponding to a shape of the protruding portion 3411 but is not limited thereto. The elastic member 3412 may be formed of a rubber material but is not limited thereto and may include a variety of materials capable of absorbing impact or vibration.

A first surface 3430 and a second surface 3440 which are both surfaces of the upper surface 3410, as described below, are supported by a third elastic support portion 1300 (refer to FIGS. 5 and 9) and a fourth elastic support portion 1400 (refer to FIGS. 6 and 9), respectively. This will be described below. A connector surface 3450 to which the connector 3001 is connected is also be supported by a fifth elastic support portion 1500 (refer to FIGS. 6 and 8) as described below. A third surface 3420 which is an opposite surface of the connector surface 3450 is supported by a second elastic support portion 1200 (refer to FIGS. 6 and 8) as described below.

Also, the gear-shaft portion 3200 may include a shaft portion 3220 and a driving gear 3240.

An end of the shaft portion 3220 may be fixedly coupled to the shaft fixing portion 2202 of the lower case 2000. Since the end of the shaft portion 3220 is fixed, when the driving motor 3000 operates, the shaft portion 3220 does not vibrate in an axial direction and only the body portion 3400 vibrates. That is, when the driving motor 3000 receives power from the outside and operates, the shaft portion 3220 necessarily vibrates in an axial direction. Here, in the driving motor 3000 according to one embodiment, since the end of the shaft portion 3220 is fixedly coupled to the lower case 2000, only the body portion 3400 vibrates.

The driving gear 3240 is engaged with the first driving gear 4200. Here, the driving gear 3240 vibrates in a direction perpendicular to a rotational axis of the first driving gear 4200 according to the operation of the first driving gear

4200. In this case, since one end of the shaft portion 3220 is fixed to the shaft fixing portion 2202, the body portion 3400 vibrates in a direction perpendicular to the rotational axis of the first driving gear 4200.

As described above, since the end of the shaft portion 3220 is fixed to the lower case 2000, the body portion 3400 vibrates according to the operation of the driving motor 3000. Accordingly, it is necessary to prevent the vibrations of the body portion 3400.

The upper case 1000 according to one embodiment may accommodate the motor to prevent the vibrations of the body portion 3400 and will be described below in detail with reference to the drawings.

Figure 5:
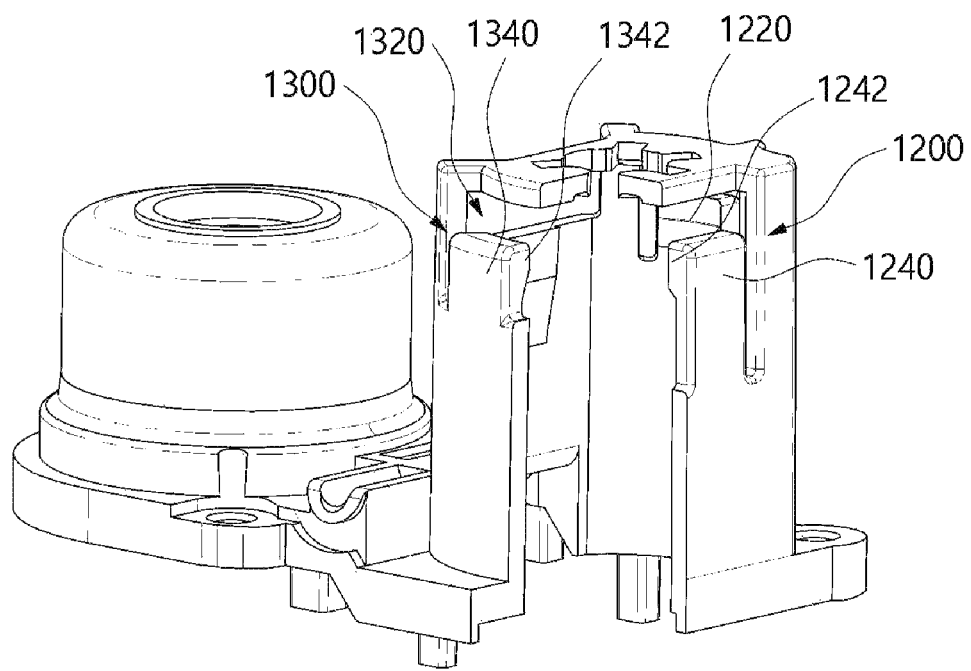
FIG. 5 illustrates a first cross section of an upper case according to one embodiment.
Figure 6:
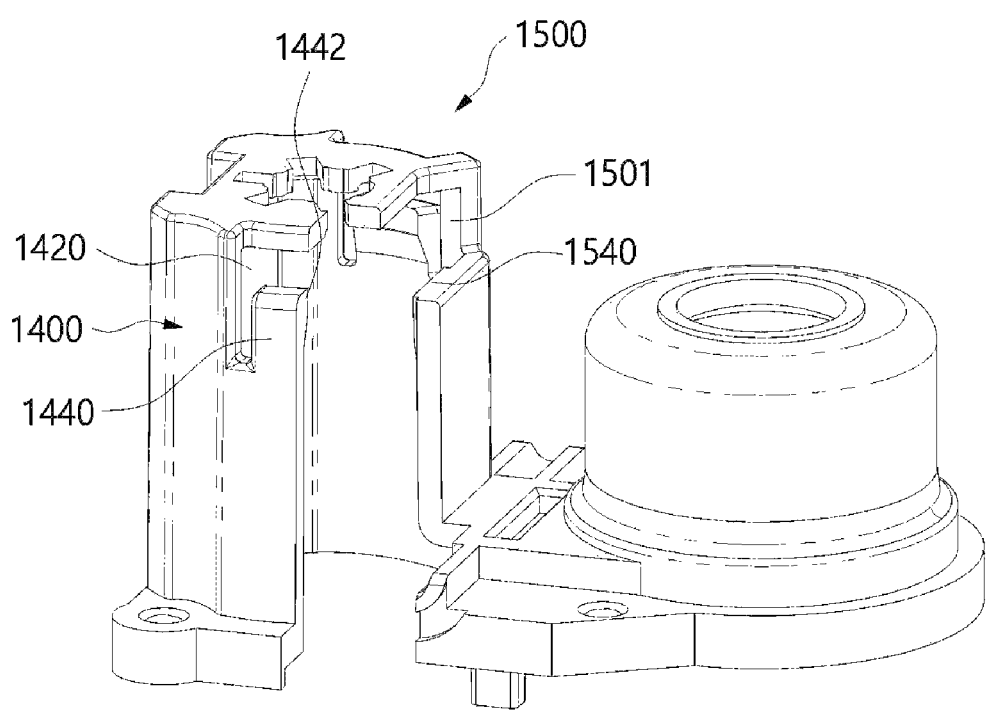
FIG. 6 illustrates a second cross section of the upper case according to one embodiment.
Figure 7:
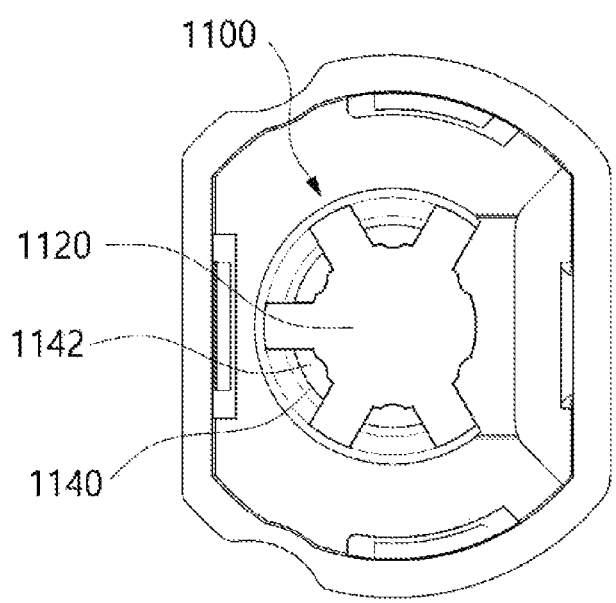
FIG. 7 illustrates a horizontal cross section of the upper case according to one embodiment.

FIGS. 5 to 7 illustrate a variety of cross sections of the upper case according to one embodiment. In detail, FIG. 5 illustrates a first cross section of the upper case according to one embodiment, and FIG. 6 illustrates a second cross section of the upper case according to one embodiment. FIG. 7 illustrates a horizontal cross section of the upper case according to one embodiment.

Referring to FIGS. 5 to 7, the upper case 1000 may include a motor accommodation portion 1020.

The motor accommodation portion 1020 may elastically support the body portion 3400 so as to suppress the vibrations of the body portion 3400 and prevent noise.

The motor accommodation portion 1020 may include first to fifth support portions 1100, 1200, 1300, 1400, and 1500 configured to support respective surfaces 3410, 3420, 3430, 3440, and 3450 of the body portion 3400, respectively, except a surface on which the shaft portion 3220 is formed.

First, the first elastic support portion 1100 configured to elastically support the upper surface 3410 of the body portion 3400 will be described.

The first elastic support portion 1100 includes a first opening portion 1120 and a first elastic protruding portion 1140. In detail, the first elastic support portion 1100 is formed on an upper surface of the motor accommodation portion 1020. The first opening portion 1120 may be formed in the form of an opening by partially eliminating the upper case 1000. The first opening portion 1120 may have a circular shape to allow the first elastic protruding portion 1140 to be formed symmetrically but is not limited thereto. Also, a variety of shapes allowing the first elastic protruding portion 1140 to be formed symmetrically may be applied.

The first elastic protruding portion 1140 may be formed to protrude along a periphery of the first opening portion 1120. Here, one or more of such first elastic protruding portions 1140 may be formed and may have a symmetrical shape with respect to a certain axis. Also, the first elastic protruding portion 1140 may further include a first contact protruding portion 1142. The first contact protruding portion 1142 may further protrude from the first elastic protruding portion 1140 toward the upper surface 3410 of the motor.

That is, the first elastic protruding portion 1140 may have one end which is a free end and may elastically support the upper surface 3410 of the driving motor as described below.

Also, the second elastic support portion 1200 elastically supports the third surface 3420 (refer to FIG. 4) of the driving motor 3000. The second elastic support portion 1200 includes a second opening portion 1220 and a second elastic protruding portion 1240.

The second opening portion 1220 may have a variety of shapes. The second elastic protruding portion 1240 may be formed to extend from one side of the second opening portion 1220. Here, a length of the second elastic protruding portion 1240 may be predetermined according to the output of the driving motor 3000 and the arrangement of the gear mechanism 4000. Also, the second elastic protruding portion 1240 may further include a second contact protruding portion 1242. The second contact protruding portion 1242, similar to the first contact protruding portion 1142, may come into contact with the third surface 3420 and support the body portion 3400.

Also, the third and fourth elastic support portions 1300 and 1400 may elastically support the first and second surfaces 3430 and 3440 of the driving motor, respectively. Third and fourth opening portions 1320 and 1420 and third and fourth elastic protruding portions 1340 and 1440 may be respectively included. Also, the third and fourth elastic protruding portions 1340 and 1440 may include a third contact protruding portion 1342 and a fourth contact protruding portion 11442, respectively. Similar to the above-described second contact protruding portion 1242, the third and fourth contact protruding portions 1342 and 1442 may come into contact with the first surface 3430 and the second surface 3440 of the body portion 3400, respectively, so as to support the body portion 3400.

Here, lengths of the second to fourth elastic protruding portions 1240, 1340, and 1440 may vary according to the output of the driving motor 3000 or the arrangement of the gear mechanism 4000. As an example, when a direction in which the first driving gear 4200 (refer to FIG. 3) comes into contact with the driving gear 3240 is a direction toward the second elastic protruding portion 1240, the vibrations of the body portion 3400 become stronger in a direction toward the second elastic protruding portion 1240 such that the length of the second elastic protruding portion 1240 may be longer than the lengths of the third and fourth elastic protruding portions 1340 and 1440. However, this is merely an example and it should be understood that the length of the third elastic protruding portion 1340 or the fourth elastic protruding portion 1440 may be longer than the length of the second elastic protruding portion 1240 when the direction in which the first driving gear 4200 (refer to FIG. 3) comes into contact with the driving gear 3240 is a direction toward the third or fourth elastic protruding portion 1340 or 1440.

Also, the fifth elastic support portion 1500 may support the connector surface 3450 to which the connector 3001 (refer to FIG. 1) of the driving motor 3000 is connected. The fifth elastic support portion 1500 may further include a fifth contact protruding portion 1540. The fifth contact protruding portion 1540 may come into contact with the connector surface 3450 and elastically support the body portion 3400. Also, the fifth elastic support portion 1500 may include a connector connecting portion 1501. Through the connector connecting portion 1501, the driving motor 3000 may be accommodated in the motor accommodation portion 1020 and then the connector 3001 may be connected to the driving motor 3000.

In the above, the motor accommodation portion 1020 of the upper case 1000 has been described. Hereinafter, an implementation example of a case in which the actuator mechanism 10000 according to one embodiment is assembled will be described with reference to the drawings.

Figure 8:
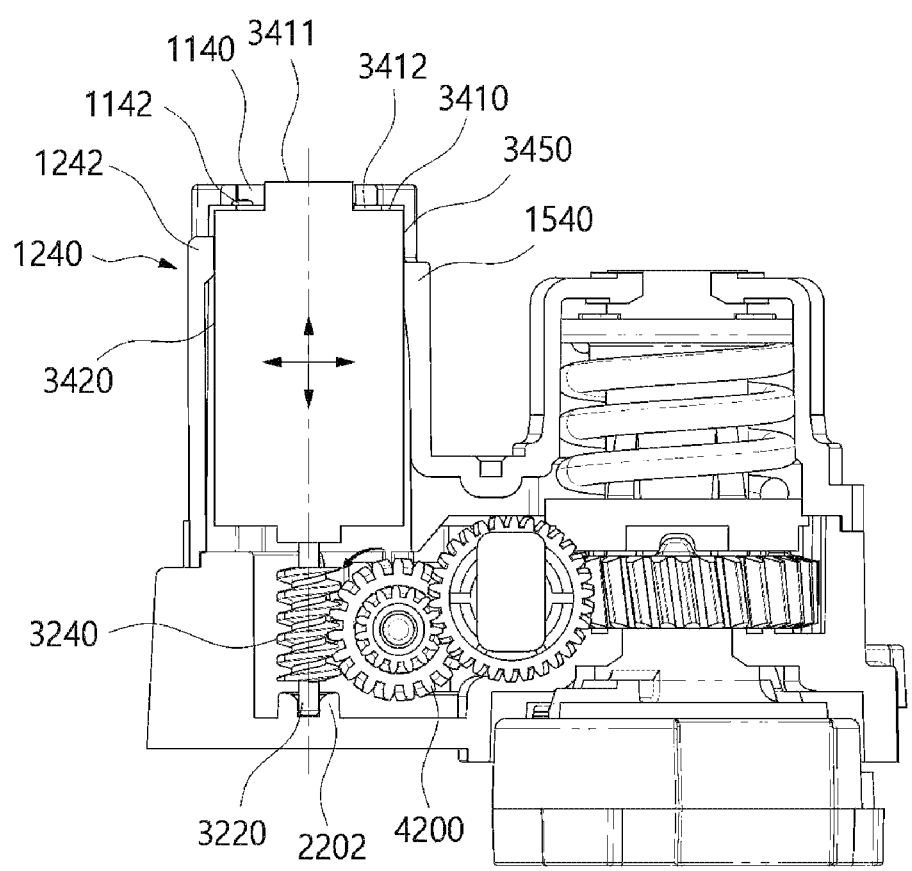
FIG. 8 illustrates a first coupling cross section of the actuator mechanism according to one embodiment.
Figure 9:
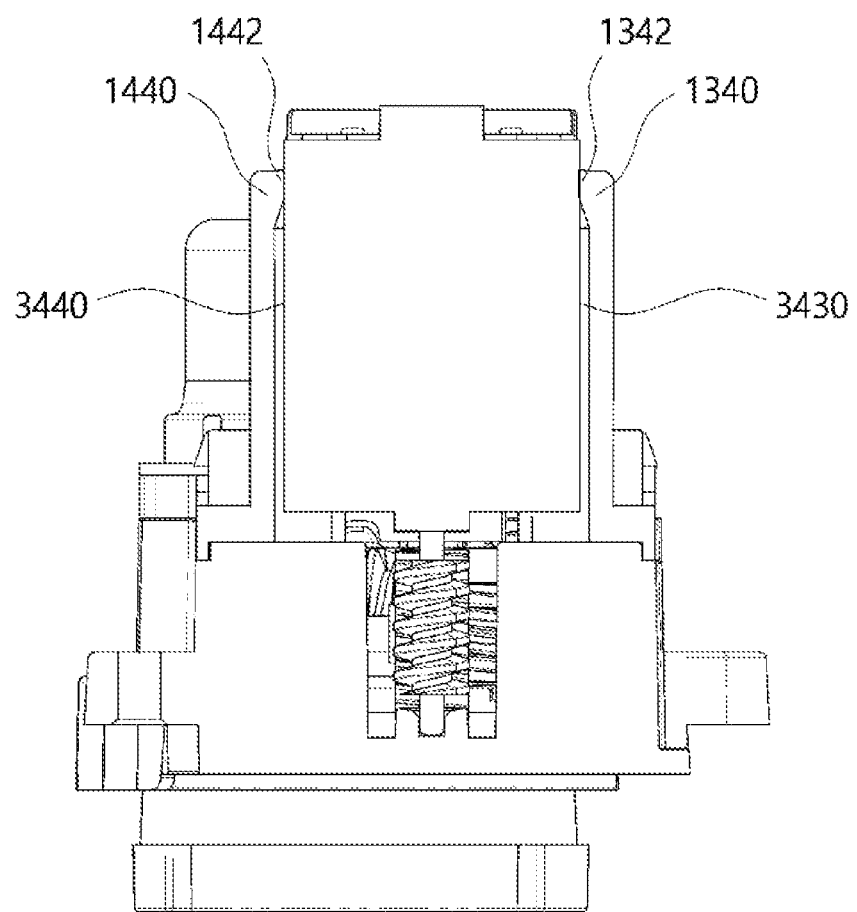
FIG. 9 illustrates a second coupling cross section of the actuator mechanism according to one embodiment.

FIGS. 8 and 9 illustrate a variety of examples of coupling cross sections of the actuator mechanism according to one embodiment. In detail, FIG. 8 illustrates a first coupling cross section of the actuator mechanism according to one embodiment, and FIG. 9 illustrates a second coupling cross section of the actuator mechanism according to one embodiment.

Referring to FIG. 8, the body portion 3400 may be accommodated in the motor accommodation portion 1020. In detail, the protruding portion 3411 of the driving motor 3000 may be inserted into the first opening portion 1120. Also, the first elastic protruding portion 1140 may elastically support the upper surface 3410. In detail, the first contact protruding portion 1142 may support the upper surface 3410 of the motor or may come into contact with the elastic member 3412 mounted on the protruding portion 3411 of the motor and support the body portion 3400 of the motor.

One end of the shaft portion 3220 is fixed to the shaft fixing portion 2202 and thus the body portion 3400 vibrates when the driving motor 3000 operates. When the body portion 3400 vibrates in axial direction of the shaft portion 3220, the first contact protruding portion 1142 may come into contact with the elastic member 3412 and may elastically support the driving motor 3000 with respect to the axial direction. With this configuration, the vibration of the driving motor 3000 is relieved so that the durability of the actuator mechanism 10000 may increase and noise caused by the vibrations of the driving motor 3000 may be prevented.

Referring back to FIG. 8, the first driving gear 4200 and the driving gear 3240 of the driving motor 3000 are engaged with each other so that the body portion 3400 as a whole vibrates in a direction perpendicular to the gear-shaft due to the operation of the first driving gear 4200. When the body portion 3400 vibrates in the direction perpendicular to the gear-shaft, the second contact protruding portion 1242 may come into contact with the third surface 3420 and may elastically support the body portion 3400 with respect to a vibration direction of the body portion 3400. With this configuration, the vibration of the driving motor 3000 is relieved so that the durability of the actuator mechanism 10000 may increase and noise caused by the vibrations of the driving motor 3000 may be prevented.

Hereinafter, a description will be made with reference to FIG. 9.

Referring to FIG. 9, the third and fourth elastic support portions 1340 and 1440 may elastically support the driving motor 3000. In detail, the third and fourth contact protruding portions 1342 and 1442 may come into contact with the first and second surfaces 3430 and 3440 and may elastically support the body portion 3400. Since the third and fourth contact protruding portions 1342 and 1442 stably support both surfaces (the first and second surfaces 3430 and 3440) of the driving motor 3000, excessive vibration of the driving motor 3000 may be prevented.

Figure 10:
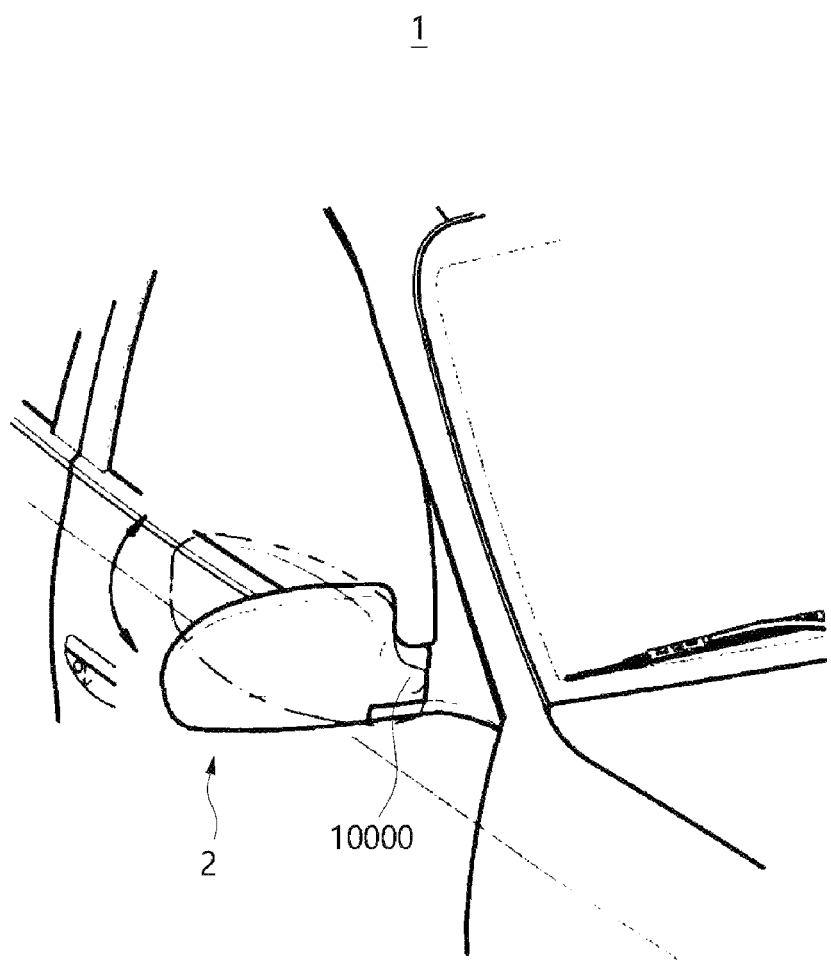
FIG. 10 illustrates an implementation example of an outside rearview mirror in which the actuator mechanism according to one embodiment is mounted.

FIG. 10 illustrates an implementation example of an outside rearview mirror in which the actuator mechanism according to one embodiment is mounted.

Referring to FIG. 10, the actuator mechanism 10000 according to one embodiment may be mounted in an outside rearview mirror 2 disposed outside a vehicle 1. Here, the outside rearview mirror 2 may include a rearview recognition member configured to provide a driver with a rear view and a housing configured to accommodate the rearview recognition member.

The actuator mechanism 10000 may be accommodated in the housing of the outside rearview mirror so as to provide rotating power to fold the outside rearview mirror 2. In the outside rearview mirror 2 for a vehicle in which the actuator mechanism 10000 according to one embodiment is mounted, noise caused by the operation of the motor may be relieved. Also, in the outside rearview mirror 2 for a vehicle in which the actuator mechanism 10000 according to one embodiment is mounted, vibration caused by the operation of the motor may be relieved so as to reinforce durability.

Although the present invention has been described with reference to limited embodiments and drawings, a variety of changes and modifications may be made by one of ordinary skill in the art from the above disclosure. For example, even when the above-described techniques are executed in an order different from the described method and/or elements such as structures, apparatuses, and the like are coupled or combined in a form different from the described method or replaced or substituted with other elements or equivalents, an adequate result may be obtained.

Therefore, other implementations, other embodiments, and equivalents thereof will belong to the scope of the following claims.

What is claimed is:

1. An actuator for folding an outside rearview mirror for a vehicle, comprising:
  a lower case comprising a shaft fixing portion;
  a driving motor comprising a gear-shaft configured to rotate along a first axis and transmit power and having one end engaged with the shaft fixing portion to be restricted in movement in a first axial direction and a body portion configured to receive power from the outside and transmit rotating power to the gear-shaft while vibrating in the first axial direction;
  a gear mechanism accommodated in the lower case and comprising a driving gear configured to receive rotating power of the gear-shaft and rotate and an output gear configured to induce rotation of the outside rearview mirror; and
  an upper case configured to accommodate the driving motor, comprising a first elastic support portion configured to elastically support a first surface of the body portion which is defined as a surface opposite a surface on which the gear shaft is located, and configured to cover the lower case,
  wherein the first elastic support portion comprises a first opening portion and one or more first elastic protruding portions configured to protrude to a predetermined length along a periphery of the first opening portion and having one side which is formed as a free end, and
  wherein at least a part of the first elastic protruding portion supports at least a part of the first surface of the body portion so as to elastically restrict vibration of the body portion in an axial direction.

2. The actuator of claim 1, wherein the upper case further comprises a second elastic support portion configured to elastically support a second surface of the body portion which is defined as a surface facing a direction substantially perpendicular to the first axis,
  wherein the second elastic support portion comprises a second opening portion and a second elastic protruding portion configured to protrude to a predetermined length from at least a part of the second opening portion and having one side which is formed as a free end, and
  wherein at least a part of the second elastic protruding portion comes into contact with the second surface of the body portion so as to elastically restrict vibration of the body portion in a direction perpendicular to the first axis, the vibration caused by the driving gear.

3. The actuator of claim 2, wherein the upper case further comprises a third elastic support portion and a fourth elastic support portion which are configured to elastically support a third surface and a fourth surface, respectively, which are both surfaces of the second surface of the body portion,
  wherein the third and fourth elastic support portions comprise a third opening portion and a fourth opening portion and a third elastic protruding portion and a fourth elastic protruding portion which protrude to a predetermined length from at least parts of the third and fourth opening portions, respectively, and have one sides which are free ends, and wherein at least parts of the third and fourth elastic protruding portions come into contact with the third and fourth surfaces of the body portion, respectively, so as to elastically restrict vibration of the body portion in a lateral direction with respect to the first axis.

4. The actuator of claim 3, wherein a length of the second elastic protruding portion is longer than lengths of the third and fourth elastic protruding portions.

5. The actuator of claim 2, wherein the upper case further comprises a fifth elastic support portion configured to protrude to support a fifth surface of the body portion which is defined as a surface in a direction facing the second surface.

6. The actuator of claim 2, wherein the second elastic protruding portion comprises a second contact protruding portion, and wherein the second contact protruding portion comes into contact with at least a part of the second surface of the body portion to restrict lateral vibration of the driving motor which is caused by the driving gear.

7. The actuator of claim 1, further comprising a vibration-absorbing member, wherein the vibration-absorbing member is disposed between the first elastic protruding portion and the first surface of the body portion.

8. The actuator of claim 7, wherein the first elastic protruding portion comprises a first contact protruding portion, and wherein the first contact protruding portion comes into contact with the vibration-absorbing member to restrict vibration of the driving motor in an axial direction.

9. The actuator of claim 1, wherein the one or more first elastic protruding portions are formed to be symmetrical.

10. An outside rearview mirror for a vehicle, comprising:
a rearview recognition member configured to provide a driver with a view behind the vehicle;
a housing configured to accommodating the rearview recognition member; and
an actuator accommodated in the housing and configured to fold the housing,
wherein the actuator comprises:
a lower case comprising a shaft fixing portion;
a driving motor comprising a gear-shaft configured to rotate along a first axis and transmit power and having one end engaged with the shaft fixing portion to be restricted in movement in a first axial direction and a body portion configured to receive power form the outside and transmit rotating power to the gear-shaft while vibrating in the first axial direction;
a gear mechanism accommodated in the lower case and comprising a driving gear configured to receive rotating power of the gear-shaft and rotate and an output gear configured to induce rotation of the outside rearview mirror; and
an upper case configured to accommodate the driving motor, comprising a first elastic support portion configured to elastically support a first surface of the body portion which is defined as a surface opposite a surface on which the gear shaft is located, and configured to cover the lower case,
wherein the first elastic support portion comprises a first opening portion and one or more first elastic protruding portions configured to protrude to a predetermined length along a periphery of the first opening portion and having one side which is formed as a free end, and
wherein at least a part of the first elastic protruding portion supports at least a part of the first surface of the body portion so as to elastically restrict vibration of the body portion in an axial direction.

* * * * *